(12) United States Patent
Allen et al.

(10) Patent No.: US 8,903,782 B2
(45) Date of Patent: Dec. 2, 2014

(54) APPLICATION INSTANCE AND QUERY STORES

(75) Inventors: Nicholas A. Allen, Redmond, WA (US); John A. Taylor, Bellevue, WA (US); Kartik Paramasivam, Redmond, WA (US); Dharma Shukla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 12/843,888

(22) Filed: Jul. 27, 2010

(65) Prior Publication Data
US 2012/0030169 A1    Feb. 2, 2012

(51) Int. Cl.
*G06F 17/30* (2006.01)

(52) U.S. Cl.
CPC .............................. *G06F 17/30345* (2013.01)
USPC .......................................... 707/694; 707/802

(58) Field of Classification Search
USPC ................................................. 707/694, 802
See application file for complete search history.

(56) References Cited

U.S. PATENT DOCUMENTS

| | | | |
|---|---|---|---|
| 6,636,886 B1 | 10/2003 | Katiyar et al. | |
| 6,789,127 B1 * | 9/2004 | Chandra et al. | 709/246 |
| 7,370,064 B2 | 5/2008 | Yousefi'zadeh | |
| 2002/0116405 A1 * | 8/2002 | Bodnar et al. | 707/202 |
| 2003/0058277 A1 * | 3/2003 | Bowman-Amuah | 345/765 |
| 2005/0021567 A1 * | 1/2005 | Holenstein et al. | 707/200 |
| 2005/0188380 A1 | 8/2005 | Li et al. | |
| 2007/0244975 A1 * | 10/2007 | Dillon et al. | 709/206 |
| 2008/0104083 A1 | 5/2008 | Woods | |
| 2008/0270382 A1 | 10/2008 | Thomsen et al. | |
| 2009/0083261 A1 | 3/2009 | Nagano et al. | |
| 2009/0144338 A1 | 6/2009 | Feng et al. | |
| 2009/0313311 A1 | 12/2009 | Hoffmann et al. | |
| 2010/0191884 A1 * | 7/2010 | Holenstein et al. | 710/200 |
| 2010/0299664 A1 * | 11/2010 | Taylor et al. | 717/173 |
| 2011/0196900 A1 * | 8/2011 | Drobychev et al. | 707/812 |

FOREIGN PATENT DOCUMENTS

CN              101055538 A        10/2007

OTHER PUBLICATIONS

Redlin, Charlie., "Asynchronous replication of WebSphere Process Server and WebSphere Enterprise Service Bus for disaster recovery environments", Retrieved at << http://www.ibm.com/developerworks/websphere/library/techarticles/0809_redlin/0809_redlin.html >>, Sep. 24, 2008, pp. 16.

(Continued)

*Primary Examiner* — Son T Hoang
(74) *Attorney, Agent, or Firm* — Ben Tabor; Kate Drakos; Micky Minhas

(57) ABSTRACT

An instance persistence command for an update to a state of an instance of an application can be issued. In response to the persistence command, a transaction with an instance store can be initiated. As part of the transaction, a first representation of the update can be stored in the instance store and a second representation of the update can be stored in a queue. The transaction can be committed after storing the first and second representations. After the transaction is committed, the second representation can be processed to store a third representation of the update in a query store. Application instance state information in the query store can be updated and queried without locking the instance store so that such operations in the query store can be performed asynchronously with operations in the instance store.

20 Claims, 6 Drawing Sheets

(56) References Cited

OTHER PUBLICATIONS

"Introduction to Oracle Advanced Queuing", Retrieved at << http://download.oracle.com/docs/cd/B10500_01/appdev.920/a96587/qintro.htm >>, Retrieved Date: Apr. 20, 2010, pp. 20.

Wong, et al., "Oracle Streams: a High Performance Implementation for Near Real Time Asynchronous Replication", Retrieved at << http://www.eecs.berkeley.edu/~nimar/papers/icde09_OracleStreams.pdf >>, ICDE, Proceedings of the 2009 IEEE International Conference on Data Engineering, Mar. 29-Apr. 2, 2009, pp. 12.

Mikkelsen, et al., "Ensuring Data Integrity with Asynchronous Replication", Retrieved at << http://eu.hds.com/pdf/wp_200_data_integrity_asynch_rep.pdf >>, Jul. 2005, pp. 15.

Allen, et al., "Lock Resolution for Distributed Durable Instances", U.S. Appl. No. 12/631,023, filed Dec. 4, 2009.

Allen, et al., "Persisting Application State", U.S. Appl. No. 12/485,771, filed Jun. 16, 2009.

Office Action, People's Republic of China Patent Application No. 201110219944.4, Titled Application Instance and Query Stores, Date of Dispatch: Aug. 31, 2012, pp. 9.

"International Search Report", Mailed Date: Feb. 24, 2012, Application No. PCT/US2011/044907, Filed Date: Jul. 21, 2011, pp. 9.

Office Action, People's Republic of China Patent Application No. 201110219944.4, Titled Application Instance and Query Stores, Date of Dispatch: Apr. 26, 2013 pp. 10.

Patent Examination Report No. 1, Australian Patent Application No. 2011282969, Report Issuance Date: Dec. 4, 2013, 3 Pages.

\* cited by examiner

APPLICATION INSTANCE AND QUERY STORES

BACKGROUND

Long-running application instances, such as, for example, instances of workflow applications, often benefit from periodically persisting their work to allow for the application instance to recover after errors, crashes, or machine failures. Persisting work can also permit applications to temporarily go idle and have their resources reassigned. To persist work, an application host can coordinate the persisted state of an application instance with runtime state of the instance to ensure that a consistent checkpoint is created. For example, the persisted state for an instance may need to coordinate with application transactions, message notifications, locks, local state caches, etc. An authoritative version of the persisted state of one or more instances can be stored in a store, which will be referred to herein as an instance store.

Subsequent to persisting the application instance state, aspects of the persisted instance state can be queried in the instance store, for example to support application tools for system administration, diagnostics, health monitoring, business process tracking, reporting, visualization, or analysis. As used herein, querying and similar terms refer broadly to reading stored data. Application tools are often conceived of and implemented independently of the primary application that is executing the instance.

SUMMARY

The tools and techniques described herein can enhance the use of persisted state representations in an instance store by also storing corresponding representations in one or more query stores. This can provide benefits, such as allowing application tools to query the application state in a query store without locking the instance store.

In one embodiment, the tools and techniques can include issuing an instance persistence command for an update to a state of an instance of an application. In response to the persistence command, a transaction with an instance store can be initiated. As part of the transaction, a first representation of the update can be stored in the instance store and a second representation of the update can be stored in a queue. The transaction can be committed after storing the first and second representations. After the transaction is committed, the second representation can be processed to store a third representation of the update in a query store.

As used herein, the term queue refers to storage for data that is waiting to be processed. For example, it can refer to storage for data that is waiting to be published. A queue may be in any of various forms, such as a database or portion of a database. Additionally, a queue may use any of various queue processing techniques, such as a first-in-first-out technique or some other technique.

In another embodiment of the tools and techniques, a subscription request for results of application instance state updates can be received from a query service. The subscription request can include a filter. A set of results of application instance state updates can be received from a results queue. Additionally, a filter can be applied to the set of results from the results queue. Results of the set that meet a set of requirements of the filter can be published to the query service. Additionally, representations of application instance state updates corresponding to the results published to the query service can be stored in a query store.

As used herein, the term "results" and similar terms refer to representation(s) of updates to state(s) of application instance(s). For example, a "result" may indicate that an instance was created or deleted, that a variable was assigned a particular value, etc. Results may be the same as representations stored in an instance store, or they may be in some other form. For example, a result may indicate a current state (e.g., by indicating a current value of a variable) and/or a change that was made (e.g., by indicating a value that a variable was changed from and a value that a variable was changed to). Similarly, representations of state updates can refer to representations of current state and/or representations of changes that have been made to the state. For convenience, the term results is generally used to refer to representations that are being transmitted, while the term representations is generally used to refer to representations that are being stored.

In yet another embodiment of the tools and techniques, an application host can be configured to run one or more application instances. An instance store can be connected to the application host, and a results queue can be connected to the application host, possibly via the instance store. The application host, the instance store, and the results queue can be configured to participate in transactions in response to instance persistence commands for updates to states of instances of an application running on the application host. Each such transaction can include: initiating the transaction in response to an instance persistence command for an update to a state of an application instance; storing a first representation of the update in the instance store; storing a second representation of the update in the results queue; and committing the transaction. A publisher can be connected to the queue, and query services can be connected to the publisher. The publisher can be configured to process update representations in the results queue and to publish results from the queue to the one or more query services. The processing and publishing can be done without locking the instance store. Query stores can be connected to the query services, and each of the query services can be configured to respond to received results by storing in a query store representations of updates corresponding to the received results.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
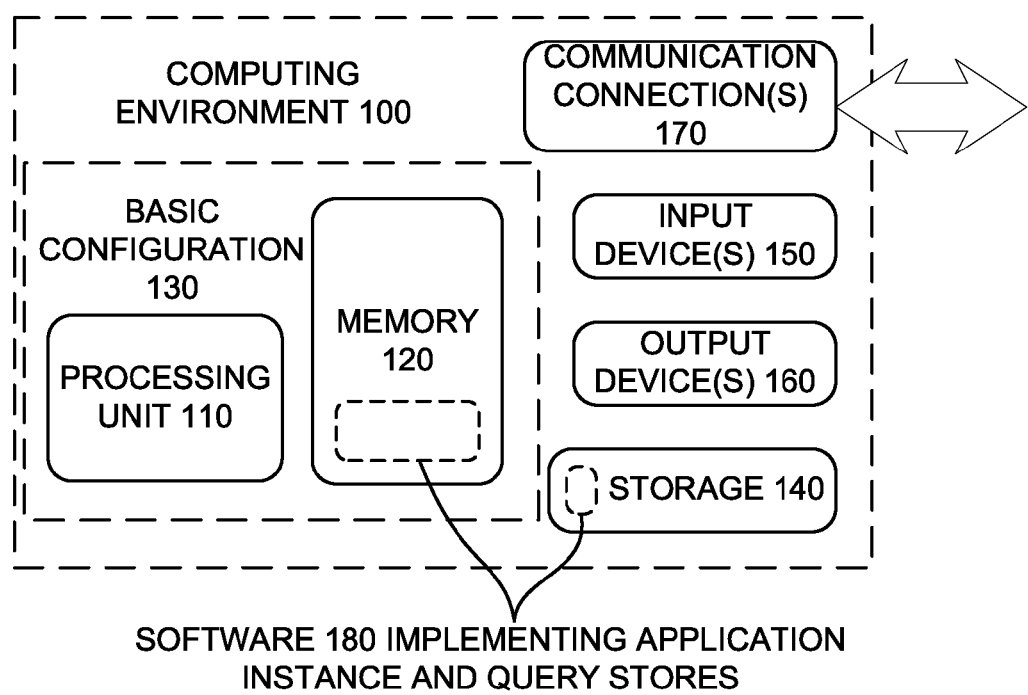
FIG. 1 is a block diagram of a suitable computing environment in which one or more of the described embodiments may be implemented.

Embodiments described herein are directed to techniques and tools for improved storing and/or querying of application instance state information. Such improvements may result from the use of various techniques and tools separately or in combination.

Such techniques and tools may include initiating a transaction with an instance store in response to an instance persistence command for an update to a state of an application instance. The transaction can include storing a first representation of the update in the instance store, storing a second representation of the update in a queue, and then committing the transaction. This may include transmitting results of the command to the queue, and possibly supplementing those results with application data that is not present in the first representation. After the transaction is committed, the second representation of the update can be processed to store a third representation of the update in a query store. This processing can be done without locking the instance store, and queries on information in the query store can also be done without locking the instance store. Accordingly, the updating and querying of the query store can be done without slowing the performance of the instance store. This can in turn improve performance of applications being persisted because such applications can spend less time waiting for operations to be performed at the instance store.

The representations in the queue may be processed using a publish-subscribe technique. For example, query services that are each connected to a different query store can subscribe to a publisher, which is connected to the queue. The query services may provide filters with their subscription information. The publisher can publish representations from the queue as results to query services according to the subscription information. In response to these publications, the query services can update corresponding query stores with representations of the updates to the application instance state. Techniques may also be used to synchronize query stores with the instance store if the query stores are out of sync (e.g., because a store has crashed, has only recently subscribed, or has had a change in its subscription).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used to host various modules discussed herein, such as an application host, a persistence provider, an instance store, a result queue, a publisher, a query service, a query store, and/or application tools. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing application instance and query stores.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Application Instance Store and Query Store System and Environment

Figure 2:
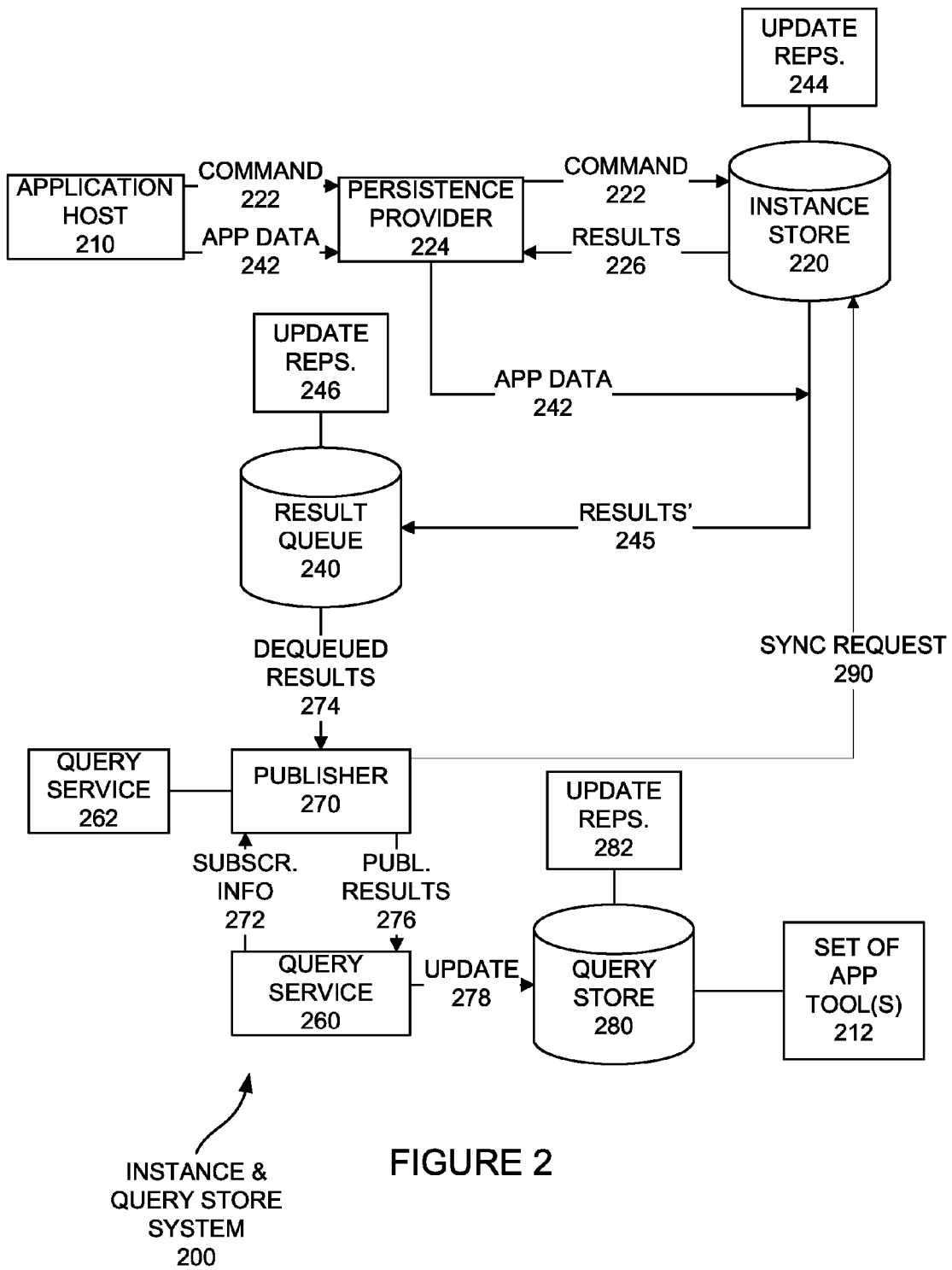
FIG. 2 is a schematic diagram of an instance and query store system.

FIG. 2 is a block diagram of an application instance and query store computer environment or system (200) in conjunction with which one or more of the described embodiments may be implemented. The system (200) can include at least one application host (210) configured to run one or more application instances. The system (200) can also include one or more application tools (212) that can separately query state information for application instances. These application tools (212) may support features such as system administration, diagnostics, health monitoring, business process tracking, reporting, visualization, or analysis.

The application host (210) is a module, such as an executing workflow program, that can execute application instances and can manipulate the instance state stored in an instance store (220) to reflect the instance execution results. The instance store (220) can be a form of persistent storage, such as a persistent database. The application host (210) can submit instance persistence commands (222) to the instance store (220) through a persistence provider (224). The persistence provider (224) can be connected to the instance store (220) and to the application host (210) (indeed, the persistence provider may be part of the application host (210)) to pass the commands to the instance store (220), and can track the application state results (226) that are returned by the instance store in response to the issued commands (222).

There can be disadvantages to having the application host (210) and application tools (212) operate against the same instance store (220). For example, the coordinated access of data between two processes may introduce locking of tables, pages, rows, values, or other types of regions of the instance store (220). Such locking could have computational overhead, which could slow the rate at which instances were executed by causing execution of the application host (210) to block temporarily while a query was being performed by one of the application tools (212). The simultaneous execution of application instances and queries on the same instance store (220) could similarly introduce application-level locking costs by serializing or delaying instance persistence commands while query commands are being performed.

Moreover, the storage organization of data in the instance store (220) may be made advantageous for instance execution, while a different storage organization may be advantageous for queries. As applications tools may be developed independently from or even subsequent to the application host, it may be difficult to accommodate these different preferences with a single storage solution.

Instead, the system (200) of FIG. 2 can replicate updates of the instance store (220) so that instance execution and queries can be isolated from one another. Although this asynchronous replication can delay the propagation of instance state changes to the query processor, many types of application tools (212) are insensitive to this delay. For example, interactive applications are already limited by the rate at which information can be displayed and the user can enter commands. Reporting applications may run in the background at a low priority and reflect results that are hours old before the report is viewed. Historical records may be insensitive to ongoing changes in instance state. These types of delays may dwarf the asynchronous delay of propagating updates of the instance store (220) for use in querying.

The system of FIG. 2 can include a result queue (240), which can be connected to the application host (210), such as through the instance store (220) and/or the persistence provider (224). The result queue may be a form of persistent storage, such as a persistent database. The result queue (240) can asynchronously decouple the front-end system (such as the persistence provider (224) and instance store (220)) that is interacting with an application instance run by the application host (210) from a back end system that provides representations of state updates to be queried by the application tools (212). Because of this decoupling, the introduction of the back-end system (which may include one or more additional queues) for propagating representations of updates to the state of the application instance for use in servicing queries may have little or no impact on the perceived delay of updates.

Referring still to FIG. 2, the application host (210) can be configured to execute an instance persistence command (222) to update representations of instance state in the instance store (220). The application host (210) may also have application data (242) that is interesting to the application tools (212) but is not part of the instance state to be stored in the instance store (220).

The persistence provider (224) can be configured to provide the appropriate instance persistence command (222) to the instance store (220). Responsive to the instance persistence command (222), the instance store (220) can store representation(s) (244) of the update(s) represented by the instance persistence command (222), and can provide the persistence provider (224) with results (226) of the instance persistence command (222).

The persistence provider (224) can create a results' (245) responsive to the results (226) of the instance persistence command (222). The results' (245) may be similar to the results (226) but supplemented with the application data (242) from the application host that was not present in the results (226). Additionally, the results' (245) may exclude ephemeral portions of the results (226) of the instance persistence command (222).

Figure 3:
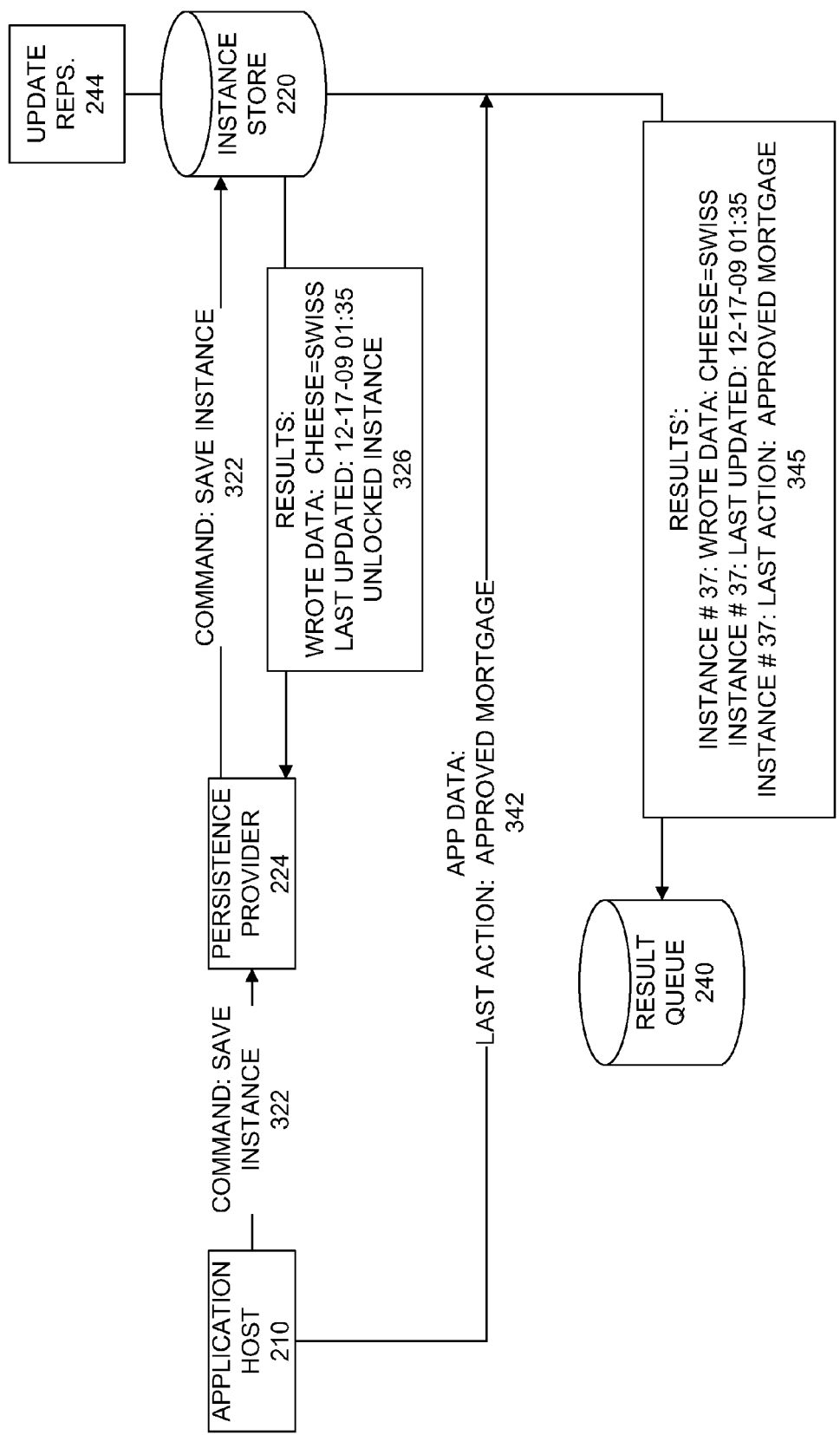
FIG. 3 is a schematic diagram of a portion of an instance and query store system.

FIG. 3 illustrates a situation where the application host (210) passes a "save instance" command (322) through the persistence provider (224) to the instance store (220), where the command (322) can be processed to make corresponding changes to the instance state update representations (244). The instance store (220) can return to the persistence provider (224) the results (326), which can include the following data to represent the update: "Wrote Data: Cheese=Swiss; Last Updated: 12-17-09 01:35; Unlocked Instance". The application host (210) can add application data (342) (which can include "Last Action: Approved Mortgage") to the results (326) to produce results' (345). The results' (345) can also omit the ephemeral "Unlocked Instance" data from the results (326). Accordingly, the results' (345) can be produced from the results (326), with the application data (342) "Last Action" being added to the results (326) and an ephemeral 'Unlocked' action being removed from the results (326). This production of the results' (345) can be done by one or more of various modules, such as the application host (210), the persistence provider (224), the instance store (220), and/or the result queue (240).

Referring back to FIG. 2, the persistence provider (224) can enqueue the results' (245) in the result queue (240). The instance persistence command (222) can be performed under a transaction, where changes to the application state, changes to the instance state, and the enqueuing of the results' (245) as state update representations (246) in the result queue (240) can be done atomically as part of the transaction. The application host (210), the instance store (220), and the result queue (240) can be configured to participate in such transactions in response to instance persistence commands (222) for updates to state(s) of instance(s) of application(s) running on the application host (210). Each such transaction can include initiating the transaction in response to an instance persistence command (222) for an update to a state of an application instance, storing a first representation of the update as part of the representations (244) in the instance store (220), storing a second representation of the update as part of the representations (246) in the result queue (240), and committing the transaction.

Referring still to FIG. 2, one or more query services (260 and 262) can be connected to a result update publisher (270), which can in turn be connected to the result queue (240). A query service (260) can register an interest in receiving instance persistence command results by sending subscription information (272) to the result update publisher (270) that is connected to the result queue (240). The subscription information (272) can include a filter, which may include in the subscription, for example, all of the instance persistence command results, or, alternatively, only a portion of the instance persistence command results. For example, the filter may only include in the subscription the instance persistence command results for an instance 123, only the instance persistence command results for commands that ran after 5:00 PM, or only the instance persistence command results that set the value of a particular variable. In addition to a subscription filter, the subscription information (272) may also include contact information for the subscribing query service (260).

The result update publisher (270) can process the queued update representations (246) by dequeuing instance persistence command results (274) from the result queue (240). The boundaries between sets of dequeued instance persistence command results (274) may differ from the boundaries when the corresponding results' (245) were enqueued. For example, the persistence provider (224) may enqueue a batch of instance persistence command results' (245) for all of the changes done under a single transaction while the result update publisher may receive each change individually in the dequeued results (274).

The results update publisher (270) can apply the subscription information (272) to publish instance persistence command results (276) to each of the subscribers whose subscription filter matches the dequeued set of instance persistence command results (274). The instance persistence command results may be published in any of various ways. For example, the publisher (270) may push the results (276) to the subscriber query service (260) by sending the published results (276) as a message or event; or may create a result cursor that the subscriber can read the published results (276) from later. The result cursors may share amongst themselves a single copy of the published instance persistence command results (276), rather than replicating the results for each subscriber query service (260 and 262).

The processing and publishing of the results (274 and 276) can be done without locking the instance store (220). Accordingly, this publishing may be done asynchronously with respect to operations in the instance store (220).

Each query service (260 and 262) may be connected to a query store (280) and configured to use the received instance persistence command results (276) to perform updates (278) on the query store (280), so that the query store (280) can include representations (282) of updates to the state of application instance(s) hosted by the application host (210) in the instance store (220) that correspond to published results (276) received at the query service (260). The query store (280) may be any of various types of storage, such as a type of persistent or non-persistent storage. For simplicity in FIG. 2, a query store (280) is illustrated for one query service (260), but not for the other query service (262). However, it is to be understood that the other query service (262) could also update its own query store. Moreover, the system (200) could include just a single query service, or it could include many more query services than are illustrated in FIG. 2. Likewise, the system (200) could include more or less of other illustrated modules, such as more application hosts, etc.

Referring still to FIG. 2, the query store (280) may mirror the instance store (220) or may represent only a portion of the instance store (220), depending on how the subscription filter is configured. Additionally, the query store (280) may include additional application information that is not present in the instance store (220).

The instance persistence command results may be transformed by various modules in the system (200). For example, the query service (260) may perform transformations on the published instance persistence command results (276) prior to using them to update the query store (280). Also, the organization of the query store (280) may differ significantly from the organization of the instance store (220). For example, the query store (280) may be a distributed cache while the instance store (220) may be a relational database. A schema for the query store (280) may contain tables and columns specialized to the application tools (212) that interact with that query store (280), such as, for example, predefined columns for application data (242) provided by the application host (210) that is not a part of the instance store (220).

The set of application tool(s) (212) can query information in the corresponding query store (280). The execution of the queries can be independent of the storage organization and runtime artifacts for the instance store (220), so that the query store (280) can be updated and queries can be run on the query store (280) without locking the instance store (220). Thus, operations on the instance store (220) can be run asynchronously with operations on the query store (280).

From time to time it may be beneficial to initially synchronize or to resynchronize the contents of the instance store (220) and the query store (280). The synchronization of the contents of these stores is a type of transmission between the two resources, but there can be different strategies for performing this transmission operation.

For example, the query store (280) may not be durable or there may not have been subscribers capturing the events requested by an application tool in the set (212). To synchronize such a query store (280) with the instance store (220), a query service (260) can send to the publisher (270) a request (not shown) to synchronize with the instance store. The publisher (270) can respond by sending a synchronization request (290) to the instance store (220) for synchronization information, such as a retransmission of previous instance persistence command results. The instance store (220) can respond by sending the requested synchronization information (such as in the form of instance persistence command results' (245)) by enqueuing them in the result queue (240) in the normal manner. The publisher (270) can publish these instance persistence command results (274, 276) from the queue (240) to one or more of the query services (260 and/or 262) in the normal manner.

Figure 4:
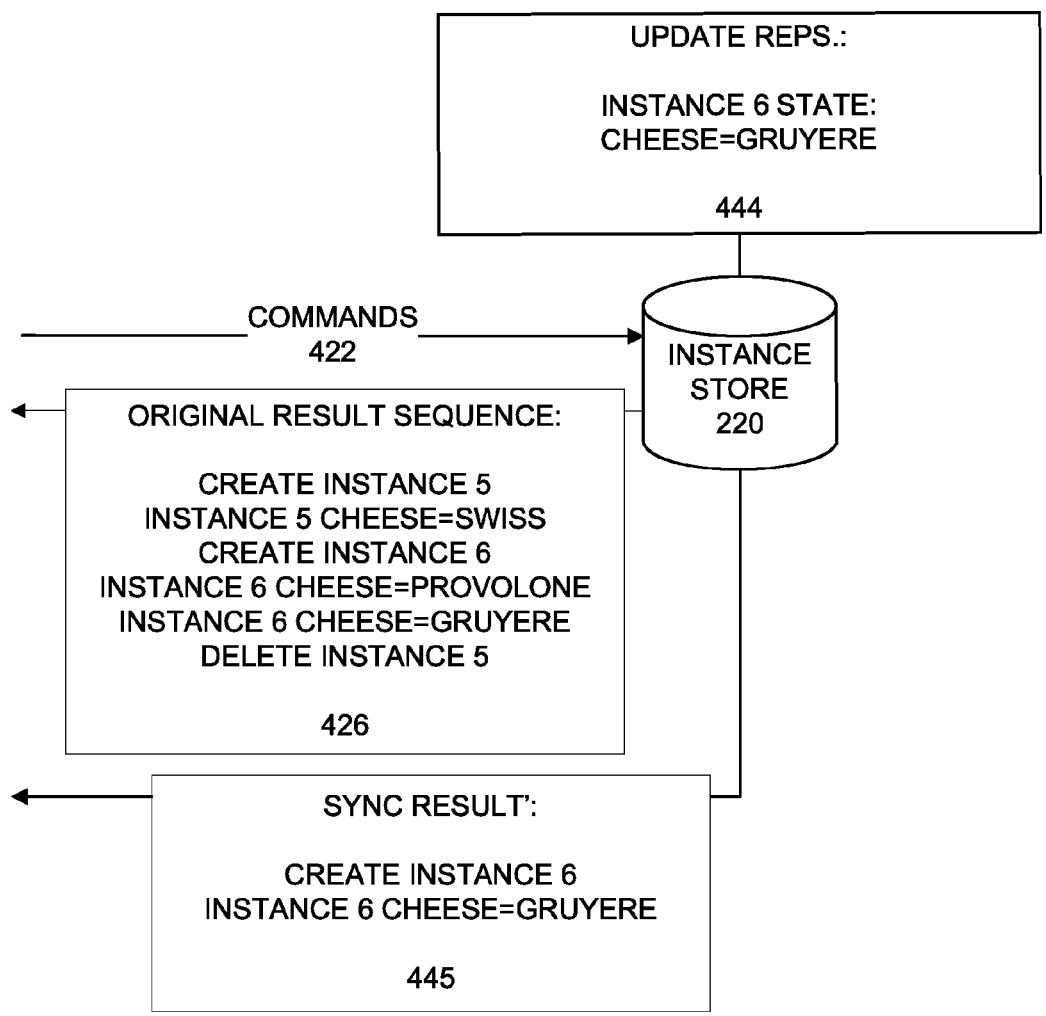
FIG. 4 is a schematic of a portion of an instance and query store system.

The retransmitted instance persistence command results' (245) may differ from those originally transmitted. An example of this difference will be discussed with reference to FIG. 4. As illustrated in FIG. 4, a series of commands (422) to the instance store (220) resulted in the following result sequence (426) being returned to the persistence provider (not shown in FIG. 4): Create Instance 5; Instance 5 Cheese=Swiss; Create Instance 6; Instance 6 Cheese=Provolone; Instance 6 Cheese=Gruyere; Delete Instance 5.

Thus, instance 5 has been deleted, and the value of Instance 6 Cheese was "Provolone", but has been overwritten with "Gruyere". The update representations (444) of the instance state in the instance store (220) may only reflect the current state. If so, that current state may only indicate that the Instance 6 state includes Cheese=Gruyere, with no indication that Instance 5 was present, and no indication that Instance 6 Cheese had previously been set to the value of "Provolone". Accordingly, the synchronization result' (445) may indicate results that would lead to the current state in the update representations (444), but not the history of the entire result sequence (426). Accordingly, after overwriting or deleting portions of the instance state, the retransmitted instance persistence command results' (445) may reflect the cumulative results of several instance persistence commands (422), rather than the intermediate results of each of the commands (422). Alternatively, the instance store (220) may retain some or all of the history of the commands (422) and/or the result sequence (426), so that the synchronization results' (445) may represent all or a portion of that history.

Referring back to FIG. 2, the instance persistence command results' (245) and the update representations (244) may have associated timestamps and/or sequence numbers. The result update publisher (270) and the instance store (220) may use these identifiers to resynchronize only a portion of the instance store (220). For example, the result update publisher (270) may indicate that it only wants synchronization information for instance state updates that may be relevant to the month of August 2009. As another example, the result update publisher (270) may indicate that it only wants the retransmission of instance persistence command results' (245) that had been sent previously with synchronization numbers 1401-1420.

Similarly, the result update publisher (270) may limit the synchronization request to only a portion of the instance store (220), such as a particular instance or the values of particular variables. The result update publisher (270) may use the subscription filters provided by subscribing query services (260 and/or 262) to construct this bounded request by excluding from the synchronization request (290) a portion of the instance store whose instance persistence command results' (245) would not pass requirements of any of the subscription filters.

Upon receiving synchronization information in the form of published results (276), a query service can use the synchronization information to synchronize at least a portion of a query store (280) with at least a portion of the instance store (220), such as by using the published results (276) to update the query store (280) in the normal manner.

The connections between the modules of FIG. 2 for transmitting data (such as application data and data for commands, results, subscription information, updates, and queries) between the modules can be implemented in various ways. For example, the connection between the application host (210) and the persistence provider (224) could be made by way of function calls or application programming interface calls. The instance store (220), the result queue (240), and the query store (280) can all be databases, and connections between those databases and other modules can utilize database connections. Alternatively, some or all of the connections to the instance store (220), result queue (240), and/or query store (280) could be made with storage application programming interfaces. The publisher (270) and the query services (260) could be connected via network messaging connections. Other types of connections between modules may be used instead of and/or in addition to these types of connections.

III. Application Instance and Query Store Techniques

Several application instance and query store techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor (s) perform(s) the technique). Similarly, one or more computer-readable storage media may have computer-executable instructions embodied thereon that, when executed by at least one processor, cause the at least one processor to perform the technique.

Figure 5:
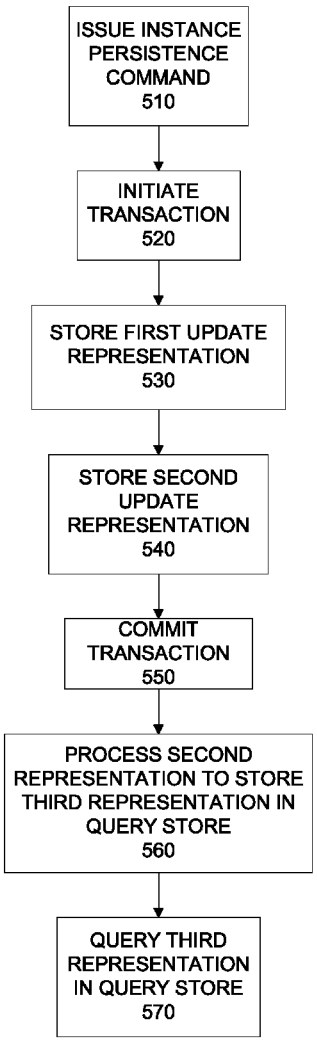
FIG. 5 is a flowchart of an instance and query store technique.

Referring to FIG. 5, an instance and query store technique will be discussed. The technique can include issuing (510) an instance persistence command for an update to a state of an instance of an application. A transaction can be initiated (520) with an instance store in response to the persistence command. As part of the transaction, a first representation of the update can be stored (530) in the instance store and a second representation of the update can be stored (540) in a queue. The transaction can be committed (550) after storing the first and second representations. After committing (550) the transaction, the second representation of the update can be processed (560) to store a third representation of the update in a query store. The storage of the first, second, and third representations may each be performed in standard ways, such as with standard database storage techniques. The transaction can include locking at least a portion of the instance store, but processing the second representation of the update can be done without locking the instance store. The technique can further include querying (570) the third representation in the query store without locking the instance store.

The first, second, and third representations of the update may be the same as each other, but they may be different from each other. For example, the technique may include supplementing the second representation of the update with application data that is not present in the first representation. Also, the instance store can include information that is not in the query store, such as information about the state of the application instance. Processing the second representation of the update to store a third representation of the update in a query store can include applying a filter to the second representation.

Figure 6:
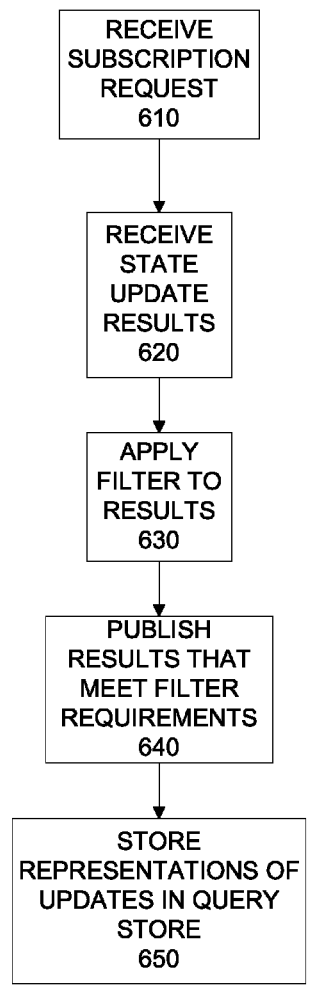
FIG. 6 is a flowchart of another instance and query store technique.

Referring now to FIG. 6, another instance and query store technique will be discussed. The technique can include receiving (610) from a query service a subscription request for results of application instance state updates. The subscription request can include a filter, and may also include other information, such as contact information for the subscribing query service that sent the subscription request. The technique can also include receiving (620) a set of results of one or more application instance state updates from a results queue. The filter from the query service can be applied (630) to the set of results, so that one or more results from the set that meet a set of requirement(s) of the filter can be published (640) to the query service. One or more representations of one or more application instance state updates corresponding to the results published to the query service can be stored (650) in a query store.

The technique of FIG. 6 can also include storing in an instance store representations of application instance state updates corresponding to the set of results. Publishing (640) to the query service and storing (650) in the query store can be done without locking the instance store. Additionally, the technique can include receiving from the query service a request to synchronize with the instance store. In response to the request to synchronize, synchronization information can be requested from the instance store. The requested synchronization information can be received from the instance store, and at least a portion of the synchronization information can be forwarded to the query service. At least a portion of the synchronization information can be used to synchronize at least a portion of a query store with at least a portion of the instance store.

The technique of FIG. 6 may include issuing an instance persistence command for an update to a state of an application instance of an application. A transaction between the application and an instance store can be initiated in response to the persistence command. As part of the transaction, a first representation of the update can be stored in the instance store and a second representation of the update can be stored in the results queue. After the transaction is committed, the second representation can be processed to store a third representation of the update in the query store.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
issuing an instance persistence command for an update to a state of an instance of an application running on an application host;
initiating a transaction with an instance store in response to the instance persistence command, the instance store being connected to the application host;
as part of the transaction, causing a first representation of the update to be stored in the instance store; and
as part of the transaction, causing a second representation of the update to be stored in a queue;
committing the transaction after the first representation and the second representation have been stored; and
processing the second representation of the update to cause storage of a third representation of the update in a query store that is a different store from the instance store, at least a portion of the processing of the second representation being performed after committing the transaction, the processing of the second representation comprising applying a filter to the second representation of the update to obtain the third representation of the update that meets one or more requirements of the filter, wherein the transaction includes obtaining a lock on at least a portion of the instance store, and wherein the lock is released prior to the third representation being stored in the query store.

2. The method of claim 1, wherein the processing the second representation of the update is done without locking the instance store.

3. The method of claim 1, further comprising querying the third representation in the query store without locking the instance store.

4. The method of claim 1, wherein the second representation of the update is different from the first representation of the update.

5. The method of claim 4, further comprising supplementing the second representation of the update with application data that is not present in the first representation of the update.

6. One or more computer-readable memories having computer-executable instructions embodied thereon that, when executed by at least one processor, cause the at least one processor to perform acts comprising:
issuing an instance persistence command for an update to a state of an instance of an application running on an application host;
initiating a transaction with an instance store in response to the instance persistence command, the instance store being connected to the application host;
as part of the transaction, causing storage of a first representation of the update in the instance store; and
as part of the transaction, causing storage of a second representation of the update in a queue;
committing the transaction after the first representation and the second representation have been stored; and
processing the second representation of the update to cause storage of a third representation of the update in a query store that is a different store from the instance store, at least a portion of the processing of the second representation being performed after committing the transaction, the processing of the second representation comprising applying a filter to the second representation of the update to obtain the third representation of the update that meets one or more requirements of the filter, wherein the transaction includes obtaining a lock on at least a portion of the instance store, and wherein the lock is released prior to the third representation being stored in the query store.

7. The one or more computer-readable memories of claim 1, wherein the acts further comprise:
receiving from a query service connected to the query store a request to synchronize with the instance store;
in response to the request to synchronize, requesting synchronization information from the instance store;
receiving the requested synchronization information from the instance store; and forwarding at least a portion of the requested synchronization information to the query service.

8. The one or more computer-readable memories of claim 7, wherein the acts further comprise using the at least a portion of the synchronization information to synchronize at least a portion of the query store with at least a portion of the instance store.

9. The one or more computer-readable memories of claim 6, wherein the processing the second representation of the update is done without locking the instance store.

10. The one or more computer-readable memories of claim 6, further comprising querying the third representation in the query store without locking the instance store.

11. The one or more computer-readable memories of claim 6, further comprising supplementing the second representation of the update with application data that is not present in the first representation of the update.

12. A computer system comprising:
an application host configured to run one or more application instances;
an instance store connected to the application host;
a results queue connected to the application host, wherein the application host, the instance store, and the results queue are configured to participate in transactions in response to instance persistence commands for updates to one or more states of one or more instances of an application running on the application host;
at least one computer processor;
memory comprising instructions stored thereon that when executed by the at least one computer processor cause the at least one processor to perform the transactions, each of the transactions comprising:
initiating the transaction in response to an instance persistence command for an update to a state of an application instance of the application;
storing a first representation of the update in the instance store while locking at least a portion of the instance store;
storing a second representation of the update in the results queue; and
committing the transaction after storing the first and second representations of the update;
a publisher connected to the results queue;
one or more query services connected to the publisher, the publisher being configured to process update representations in the results queue to publish results from the queue to the one or more query services, the processing and publishing being done without locking the instance store; and
one or more query stores connected to the one or more query services, each of the one or more query services being configured to respond to received results that are received from the publisher by storing in a query store of the one or more query stores representations of updates corresponding to the received results, the one or more query stores each being a different store from the instance store, and the processing and publishing by the publisher comprising filtering results with a filter so that the received results are filtered results that meet one or more requirements of the filter.

13. The computer system of claim 12, wherein at least one of the one or more query stores is configured to service queries from an application tool.

14. The computer system of claim 12, wherein the results queue is connected to the application host via the instance store.

15. The computer system of claim 12, wherein the application host comprises a persistence provider that is connected to the instance store.

16. The computer system of claim 12, wherein the transaction comprises supplementing the second representation of the update with application data that is not present in the first representation of the update.

17. The computer system of claim 12, wherein:
the one or more query services are configured to send subscription information to the publisher; and
the publisher is configured to apply the subscription information to publish results to the query services.

18. The computer system of claim 17, wherein at least one of the one or more query services is configured to send to the publisher the subscription information that comprises the filter.

19. The computer system of claim 12, wherein:
a query service of the one or more query services is configured to send to the publisher a request to synchronize with the instance store;
the publisher is configured to respond to the request to synchronize by sending to the instance store a request for synchronization information;
the instance store is configured to respond to the request for synchronization information by sending the requested synchronization information to the queue; and
the publisher is configured to publish the synchronization information from the queue to at least one of the one or more query services.

20. The computer system of claim 19, wherein at least one of the one or more query services is configured to use the synchronization information to synchronize at least a portion of a query store with at least a portion of the instance store.

* * * * *